W. H. RICHARDSON.
FARM-GATE.
No. 183,595. Patented Oct. 24, 1876.
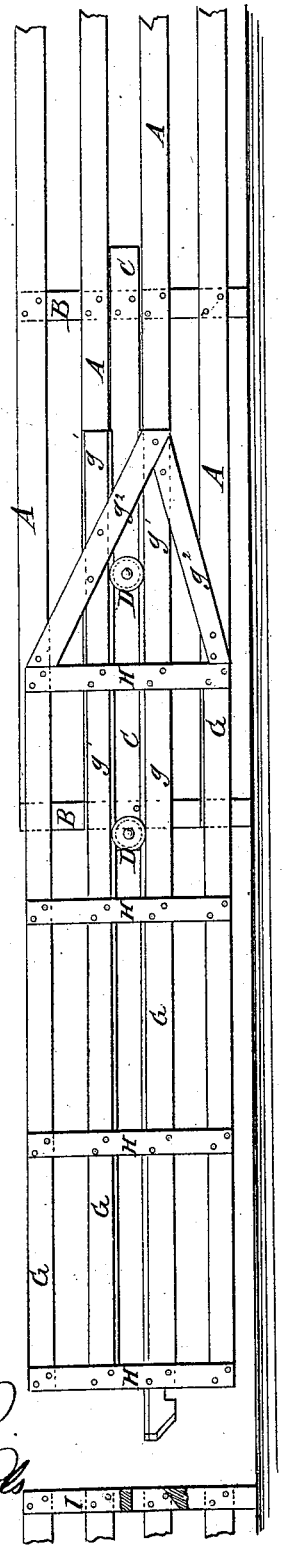
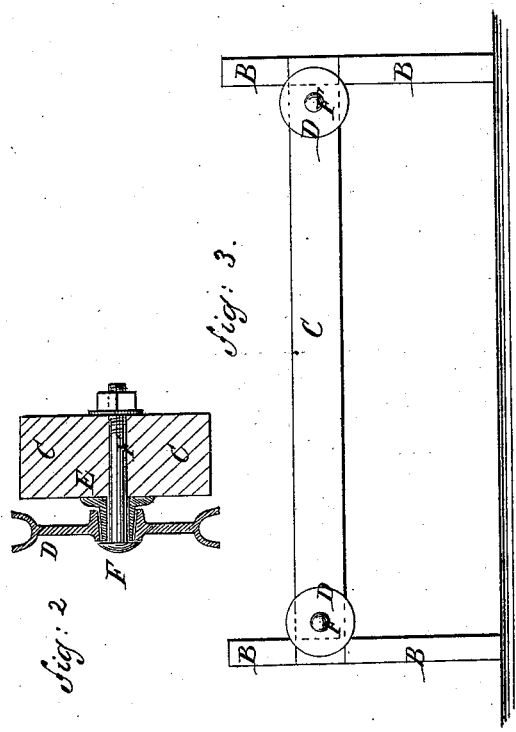

UNITED STATES PATENT OFFICE.

WILLIAM H. RICHARDSON, OF SHEBOYGAN FALLS, WISCONSIN.

IMPROVEMENT IN FARM-GATES.

Specification forming part of Letters Patent No. 183,595, dated October 24, 1876; application filed July 11, 1876.

*To all whom it may concern:*

Be it known that I, WILLIAM H. RICHARDSON, of Sheboygan Falls, in the county of Sheboygan and State of Wisconsin, have invented a new and useful Improvement in Gates, of which the following is a specification:

Figure 1 is a side view of my improved gate, shown as partly open. Fig. 2 is a sectional elevation, and Fig. 3 a side elevation of the gate-support with the wheels attached.

Similar letters of reference indicate corresponding parts.

The object of this invention is to make an improvement in that class of gates which slide open and shut over rollers, so that they may be operated with more facility, in less space, and not be so liable to get out of order.

The invention consists in clamping two rim-grooved wheels to a gate-bar so that each will revolve upon a rigid hollow bearing, through which the clamping-bolt passes.

A B represent a portion of a fence formed by attaching horizontal bars or boards A to posts B. To the two forward posts B is attached a bar, C, eight feet, more or less, in length, and to which are attached two rim-grooved wheels, D, the forward wheel being at the forward end of said bar C, and the other four feet, more or less in its rear. The wheels D revolve upon hollow journals E, through the cavity of which passes a bolt, F, which also passes through the bar C, and is secured in place by a nut. G H represent the gate, formed by attaching cross-bars H to horizontal bars G. Two of the bars G are placed at such a distance apart as to receive the wheels D between them. The cross-bars H may be notched between the boards $g^1$, to allow the wheels D to pass. The track-bars $g^1$ project at the rear end of the gate, and are strengthened by inclined brace-bars $g^2$, attached to them and to the end of the gate. One of the bars G projects at the forward end of the gate, and is beveled and notched to adapt it to catch in a mortise in the catch-post I, to fasten the gate shut.

The fence A B and the gate G H may be made of any desired style, and the supporting-bar C and the track-bars $g^1$ attached to them also right or left hand by extension of track-bars.

In the case of a rail-fence, posts must be set in the ground to receive the supporting-bar C.

When the gate is being opened, the upper bar $g^1$ bears upon the upper side of the forward wheel D, and turns it forward, and the lower bar $g^1$ bears against the lower side of the rear wheel D, and turns it backward. As the gate comes to a balance, the upper bar $g^1$ bears upon the upper side of both the wheels D, and turns them both forward. As the rear end of the gate overbalances the forward end, the upper bar $g^1$ bears upon the upper side of the rear wheel D, and turns it forward, and the lower bar $g^1$ bears upon the lower side of the forward wheel D and turns it backward. In closing the gate, the movements of the wheels D are reversed.

Having thus described my invention, I claim as new and desire to secure by Letters Patent—

The combination, with sliding gate G H and posts B B, of the two rim-grooved wheels D D, revolving on hollow bearings, and clamped by nut-bolt F, the bar C, as and for the purpose specified.

WILLIAM H. RICHARDSON.

Witnesses:
EGBERT RICHARDSON,
J. M. HOLDEN.